United States Patent Office 3,814,745
Patented June 4, 1974

3,814,745
PEROXIDE TREATED PROTEIN PHOSPHATE
COMPLEX
Nicholas Melachouris, Hartsdale, N.Y., assignor to
Stauffer Chemical Company, New York, N.Y.
No Drawing. Filed Apr. 20, 1972, Ser. No. 246,003
Int. Cl. C07g 7/00; A21d 2/26; A23j 1/20
U.S. Cl. 260—112 R                              15 Claims

ABSTRACT OF THE DISCLOSURE

Peroxide treated proteins which are subsequently complexed with polyphosphates have been found to be effective as total or partial replacements for the high heat nonfat dried milk normally used in bread.

The present invention relates to protein-phosphate complexes and to methods for adapting these complexes for effective use in bread.

PRIOR ART

Whey protein-phosphate isolates are well known in the prior art as substitutes for non-fat dried milk in baked goods as evidenced by McKee et al. Pat. 3,269,843. However, it is well known in the prior art that proteins in general, and protein phosphate isolates cannot be utilized in preparing bread. In particular, McKee et al. teach that whey-phosphate isolates which are generally termed lactalbumin phosphate are not usable in bread baking. McKee et al. do indicate that in order to use the lactalbumin phosphate in the baking of the bread, the lactalbumin phosphate must be used in combination with an oxidizing agent. It is also well known that proteins can be treated with hydrogen peroxide to effect bacteriostatic preservation as reported in Chem. Abstracts 17, 2458, Chem. Abstracts 59, 8043b, and Chem. Abstracts 70, 46, 206v. Magnesium peroxide has also been used in oxidizing casein, cf. U.S. Pat. 704,662.

It has now been found that proteins, particularly whey proteins, can be effectively treated in order to make them usable in bread by the treatment set forth in the present invention.

THE INVENTION

In accordance with the present invention, it has been found that polyphosphate complexed proteins can be made effective, per se, for use in bread baking, by treating the protein with a peroxide of the group consisting of hydrogen peroxide, sodium peroxide, potassium peroxide, magnesium peroxide, calcium peroxide, and mixtures thereof prior to complexing the protein with a polyphosphate. The so formed compositions which contain substantially no peroxide have been found to be highly effective as additives for bread, as total or partial substitutes for the high heat, non-fat dried milk normally used in bread, and to provide the same proteinaceous values contained therein without reducing the nutritious character (protein value) of the baked bread over that obtained from non-fat dried milk. Further, an oxidizing agent does not have to be used in the final dough to make the composition useful. Bread scores in a commercially acceptable range can be obtained by using the product of the present invention in place of high heat dried milk in bread formulations.

The process of the present invention involves admixing the protein or proteinaceous solution with the defined peroxide followed by complexing the peroxide treated protein with a linear condensed polyphosphate. The complex is isolated by acidifying the mixture to the precipitation point of the complex, e.g., below about pH 4, preferably between 3 and 4 and more preferably about 3.5, separating the precipitate, washing the precipitate, solubilizing the precipitate with base to a pH of around 5–7 and preferably 6–7, and spray drying the solubilized product. Substantially no peroxide remains in the final product. If any remains, as can be indicated by known tests, catalase can be used to destroy any residual peroxide.

It has been found that bread scores equivalent to those obtainable in the prior art utilizing non-fat dried milk can be obtained by this procedure even though the complex is not used in the bread dough in the presence of an oxidizing agent.

The proteins included within the present invention can be any of the animal or vegetable proteins including albumins, globulins, or mixtures thereof, such as those found in soy, soy whey, whey, etc. Preferably, the proteins used in the present invention are a mixture of the albumin and globulin forms and more preferably the protein mixture is the by-product from cheese manufacture known as whey. The remaining discussion regarding the present invention will be in connection with cheese whey though it is to be understood that it is equally applicable to all the proteins included within the generic scope of the present invention.

Whole liquid whey is liquid normally obtained from the manufacture of cheese. The whey contains soluble protein, particularly lactoglobulin and lactalbumin plus minor amounts of soluble salts, or minerals, of milk fat, and lactose. The following is the approximate composition of whole liquid whey and this is given as illustrative:

| Constituent: | Approximate percent by weight |
|---|---|
| Water | 93.2 |
| Protein | 0.9 |
| Lactose | 5.1 |
| Fat | 0.3 |
| Mineral | 0.5 |

Either sweet whey, pH about 5–6.5 or acid whey, pH about 4–5, can be used. If acid whey is used, it is preferable to neutralize the acidity prior to treatment with the peroxide. The neutralization to pH 5–7 can be effected with any basic material such as an alkali metal hydroxide such as sodium hydroxide. Because the final product is intended for food use, edible grade chemicals are preferable. The whey can be defatted, dimineralized and clarified by known methods, if desired.

The protein is then treated with a peroxide compound from the group of hydrogen peroxide, sodium peroxide, potassium peroxide, magnesium peroxide, calcium peroxide, and mixtures thereof. In connection with the alkali metal peroxides and particularly sodium peroxide, hydrolysis to the hydroxide, i.e., sodium hydroxide and hydrogen peroxide is substantially instantaneous when the metal peroxide is mixed with water. The primary reactant is hydrogen peroxide formed in situ. Because of the hydroxide formed, and if alkalinity is not desired, the alkali metal peroxide can be used in combination with hydrogen peroxide. Similarly, the alkaline earth metal peroxides also liberate hydrogen peroxide under reaction conditions.

The preferred peroxides are hydrogen peroxide, sodium peroxide, and calcium peroxide. Most preferably the peroxide is hydrogen peroxide.

The peroxide is used in an amount sufficient to provide at least .25 gram of the peroxide moiety, i.e., the $-O-O-$ group, per gram of protein. Preferably about 0.3 to 0.4 gram of the peroxide moiety are used per gram of protein. When using hydrogen peroxide aqueous solution at low strength of about 30% by weight are preferred for ease of handling. At a 30% concentration of hydrogen peroxide, approximately one milliliter of peroxide solution per 100 milliliters of uncondensed whey is required to obtain the preferred amount of peroxide moiety. The peroxide content of each of the other named peroxides can be easily determined so as to provide the amounts necessary to give the proper $-O-O-$ concentration.

The protein can be treated with the peroxide at a temperature from room temperature up to a temperature where substantial denaturation of the protein occurs. However, effective results have been found by heating the protein/peroxide solution to a temperature within the range of 40-60° C. Reaction time is fairly short, 15 minutes to one hour through 15 minutes to ½ hour are effective. To insure complete contact of the materials the solution is preferably stirred during reaction.

After reaction, the protein solution is preferably cooled to ambient temperature before adding the polyphosphate though this is not essential.

The peroxide treated whey protein is then complexed with a linear condensed polyphosphate. The linear condensed polyphosphates useful in the present invention are those which can be represented by the general formula:

$$M_{n+2}P_nO_{3n+1}$$

wherein M is an alkali metal and preferably an alkali metal having an atomic weight greater than 10 and less than 50, i.e., sodium and potassium, and $n$ is a number equal to or greater than 3. Included within this definition are sodium tripolyphosphate, sodium hexametaphosphate (Graham's salt), and Kurrol's salt (either sodium or potassium). These are given as illustrative and in no way inclusive of all the linear condensed polyphosphates which can be used in the invention. Preferably, the linear condensed polyphosphates which are used the glassy sodium polyphosphates having a number average chain length of from about 6 to about 100 and more preferably from about 9 to about 14. This latter range includes the material commonly denoted as sodium hexametaphosphate, which is the most preferred linear condensed polyphosphate.

The preferred linear condensed polymeric phosphates for use in the present invention are of the type:

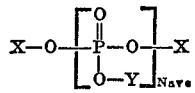

wherein X and Y represent an alkali metal, e.g., sodium or potassium, Nave represents an average chain length between about not less than 6 and about 100. The term "average chain length" or "Nave" as employed herein, is intended to represent a statistical average chain length or indication of the number of recurring units linked together comprising the anionic species. Such an average is determined by titration as described in Van Wazer et al., *Anal. Chem. 26·1775–9 (1954)*.

The polyphosphate is normally used in an amount of from about 10% to about 40% by weight based on the final dry weight of the final protein-polyphosphate isolate product. Preferably the phosphate is used in an amount of from about 10% to about 30% and more preferably from about 15% to about 25% by weight.

The complexing of the peroxide treated whey protein with a polyphosphate, as defined hereinbefore, is accomplished by mixing the two together in aqueous solution, preferably at ambient temperature and holding the solution for at least about 15 minutes to insure reaction. The pH of the solution is then decreased to below 4 and preferably above 3, e.g., approximately 3 to 3.5 which causes the complex to precipitate. The pH of the solution must be made sufficiently acidic to cause the complex to precipitate. The material is separated, optionally washed, redissolved, and neutralized to a pH of between about 5 and about 7 and preferably around 6 to provide the product. The separation can be accomplished by any known means such as centrifuging or filtration. Redissolving is accomplished in the neutralization by adding an aqueous solution of an alkali metal hydroxide to the product until a pH of about 6 is achieved. The dissolved product is usually dried by spray drying to provide the final product. Since the final product is intended for food use, edible grade reagents should be used in effecting acidification, using such acids as HCl, $H_2SO_4$, and $H_3PO_4$, and edible grade alkali for neutralization such as sodium hydroxide. The precipitated product can optionally be washed prior to neutralization using an acid solution of about the same pH as the point of precipitation to prevent loss of product due to redissolving. Other equivalent means of effecting these functions would be obvious to one skilled in the art and applicant does not intend his invention to be limited to the specific means recited herein. The present invention has been described in connection with pure whey itself as the starting material. However, any substantially undenatured protein can be treated in accordance with the present invention.

The final product is a protein-polyphosphate material adapted for direct use as a functional substitute for high-heat non-fat dried milk in bread making. The product contains substantially no peroxide as any unused peroxide is removed in the supernatant liquor in the separation step.

The product can be used as a total or partial substitute for high-heat non-fat dried milk which is normally used in bread baking. The substitution generally can be accomplished on a one to one ratio in any bread recipe, i.e., one part of the product of the invention for each part of non-fat dried milk normally used. Substitutions in any bread recipe are based on the protein values in each product. Slight variations might be necessary depending on the specific bread recipe so that more or less than a 1 to 1 ratio may be required. However, this can be easily determined by one skilled in the art.

Thus, generally and in bread recipes which require from about 1% to about 6% amount of high-heat non-fat dried milk depending on the type of bread prepared and normally arounnd 2% up to 100% of this requirement can be substituted with the product of the present invention. Thus, compositions containing from 1% to 100% of the compositions of the present invention and 99% to 0% of high-heat non-fat dried milk can be used to replace the dried milk needed in a bread recipe on a requirement basis of about 1:1.

The present invention is more fully illustrated in the examples which follow.

Example 1

To 8 liters of sweet whey (pH about 5.8) at 50° C. was added 80 milliliters of 30% hydrogen peroxide. The mixture was slowly stirred at 50° C. for 20 minutes. The reaction mixture was cooled and 72 grams of sodium hexametaphosphate (average chain length 10.3) was added. The reaction mixture was stirred for 30 minutes and the pH was then adjusted to 3.5 with 1 normal HCl. A precipitate was formed which was separated by filtration. The filtrate was washed with dilute HCl (pH 3.5) and dispersed in water by adjusting the pH to 5.7 to 6.0 with NaOH and spray dried.

Example 2

The procedure of Example 1 was followed using 3.5 liters of defatted whey at 50° C., 32 milliliters of 30% hydrogen peroxide, with a holding period of 20 minutes at 50° C. to which was added 31 grams of sodium hexametaphosphate (average chain length 10.3). The mixture was held for 15 minutes, pH adjusted to 3.5 with 1 normal HCl, and the precipitate allowed to settle 15 minutes. The product was separated by filtration, washed with dilute HCl (pH 3.5) and dispersed at pH 5.7 using 1 normal NaOH for pH adjustment. The product was stored in the freezer (−9° F.).

Example 3

To 37.8 liters of whey was added 340 g. sodium hexametaphosphate (average chain length 10.3) dissolved in 400 milliliters water. After stirring for 30 minutes, the pH was adjusted to 3.5 with 1 N HCl and the precipitate formed was removed by filtration. The filtration was washed with dilute HCl (pH 3.5), dispersed in water by adjusting the pH to 5.8 with sodium hydroxide, and spray dried.

Dough portion

| | G. |
|---|---|
| Flour (Drinkwater) | 240 |
| Sugar | 30 |
| Salt | 12 |
| High-heat non-fat dry milk solids | 35 |
| Shortening | 24 |

Water, 168 ml. (64% absorption on flour).

The sponge portion was mixed in a jacketed bowl mixer for 20 seconds at low speed and 40 seconds in medium speed. The sponge was fermented at 85° F. and 75% relative humidity for 4 hours. The sponge was then put back in bowl mixer with the dough portion of ingredients and mixed for 30 seconds at low speed and 7 minutes at medium speed to prepare the dough piece.

The dough piece then had 20 minutes of floor time after which it was made up, and panned. Dough weight was 18.5 ozs. The dough was pan proofed for 60–70 minutes at 90° F. and 75% relative humidity and the bread was baked at 425° F. for 25 minutes. After cooling, the bread was evaluated organoleptically.

The following results were obtained.

TABLE I

| Loaf properties | Max. score | Product Eq. 1, whey plus $H_2O_2$ plus polyphosphate | Product Eq. 2, whey plus $H_2O_2$ plus polyphosphate | Product Eq. 5, whey protein polyphosphate plus $H_2O_2$ | Product Eq. 3, whey protein polyphosphate | Product Eq. 4, whey protein polyphosphate | LAP [1] | Non-fat dry milk control A | B |
|---|---|---|---|---|---|---|---|---|---|
| Volume | 10 | 4 | 9 | 6 | 2 | 3 | 2 | 8 | 5 |
| Crust color | 3 | 3 | 3 | 3 | 3 | 3 | 2 | 3 | 3 |
| Break and shred | 2 | 0 | 1 | 0 | 0 | 0 | 1 | 2 | 2 |
| Slicing | 10 | 10 | 10 | 10 | 10 | 10 | 10 | 10 | 10 |
| Grain | 20 | 16 | 16 | 13 | 5 | 5 | 9 | 17 | 15 |
| Texture | 20 | 15 | 15 | 12 | 5 | 9 | 9 | 17 | 18 |
| Crumb color | 10 | 7 | 8 | 8 | 5 | 4 | 6 | 9 | 8 |
| Aroma and taste | 10 | 10 | 10 | 8 | 6 | 8 | 7 | 10 | 10 |
| Softness | 15 | 12 | 12 | 9 | 7 | 5 | 10 | 11 | 14 |
| Total score | 100 | 77 | 84 | 69 | 43 | 45 | 56 | 87 | 85 |

[1] Commercially available lactalbumin phosphate sold under the trademark "Protolac" by Borden, Inc.

Example 4

A physical mixture of the dried product described in Example 3 and of another dried product prepared from 73.5 liters of whey following the same procedure as that used to prepare product of Example 3 was prepared.

Example 5

80 grams of the whey protein polyphosphate isolate of Example 4 was dispersed in water at 50° C. (total volume 690 milliliters). To this was added 32 milliliters of 30% $H_2O_2$ and the mixture was held for 20 minutes at 50° C. The mixture was cooled and 1 milliliter of catalase was added to hydrolyze any residual hydrogen peroxide to oxygen and water. The reaction mixture was incubated at room temperature for 2 hours and stored in a freezer (−9° F.).

The protein polyphosphate isolates were tested in standard bread formulations. All samples were used on an equal protein basis with the control which used 35 grams of high-heat non-fat dried milk (low-heat non-fat dried milk is generally not used in bread making), the product normally used in making white bread of this type. The protein level of the control was 6% by weight based on the weight of the flour which is higher than the 3% value normally used in commercial bakeries. The increased amount of non-fat dried milk will lower volume slightly and provide a slightly closer (better) grain. This difference only slightly affects the score of the bread.

BREAD RECIPE AND BAKING SCHEDULE

Sponge portion

| | G. |
|---|---|
| Flour (Drinkwater) | 360 |
| Yeast | 15 |
| Yeast food (Fermoloid) | 0.4 |
| Sugar | 0.6 |

Water, 216 ml.

The results show that whey protein polyphosphate complexes cannot be effectively used in breadmaking. The scores of breads using the whey protein-polyphosphate complexes were 43 and 45 which is about half that obtained by non-fat dried milk. LAP fared only slightly better with a score of 56. A significant improvement over such complexes was noticed when the whey protein was treated with hydrogen peroxide prior to phosphate isolation as evidenced by scores of 77 and 84 respectively for the products of Examples 1 and 2. The product of Example 1 showed a better score than the product of Example 5 (whey phosphate plus after treatment $H_2O_2$). Therefore, treatment of liquid whey with hydrogen peroxide is more effective than treatment of the isolated whey protein-polyphosphate complex with an oxidizing agent.

It is also to be pointed out that bread scores above about 70 are passable for commercial usage and preferably above about 80 are required for commercial bakery products. The products of the present invention are capable of providing these commercially acceptable scores.

The invention is defined in the claims which follow.
What is claimed is:
1. A process for preparing a protein-polyphosphate isolate usable as a substitute for high-heat non-fat dried milk in bread making comprising:
   (1) reacting a protein of the albumin or globulin type or mixtures thereof with a peroxide selected from the group consisting of hydrogen peroxide, sodium peroxide, potassium peroxide, magnesium peroxide, calcium peroxide and mixtures thereof;
   (2) adding to the product of step (1) a linear condensed polyphosphate of the generic formula $$M_{n+2}P_nO_{3n+1}$$

wherein M is an alkali metal and $n$ is equal to or greater than 3 in an amount of from about 10 percent to about 40 percent by weight based on the total dry weight of the final protein polyphosphate product;

(3) adjusting the pH of the solution to a pH below about pH 4 and to a point sufficient acidic to effect precipitation of a protein-polyphosphate product; and (4) separating the product from the reaction medium.

2. The process as recited in claim 1 wherein said peroxide is hydrogen peroxide.

3. The process as recited in claim 1 wherein said protein is a mixture of proteins derived from whey.

4. The process as recited in claim 1 wherein said protein is sweet cheese whey.

5. The process of claim 1 wherein the linear condensed polyphosphate is a sodium polyphosphate having a number average chain length of from about 6 to about 100.

6. The process of claim 5 wherein the number average chain length is 9 to 14.

7. The process as recited in claim 1 wherein said polyphosphate is sodium hexametaphosphate.

8. The process of claim 1 wherein said peroxide is present in an amount sufficient to provide at least 0.25 grams of $-O-O-$ peroxide moiety per gram of protein.

9. The process as recited in claim 1 wherein said peroxide is present in an amount sufficient to provide from about 0.3 to about 0.4 grams of the $-O-O-$ peroxide moiety per gram of protein.

10. The process of claim 1 wherein said separation step includes removing the precipitated product from the reaction mixture, adding a base to said precipitated product to elevate the pH within a range of between about 5 and about 7 to solubilize the product and drying the resultant solubilized product.

11. The product of the process of claim 10.

12. The product of the process of claim 1.

13. A process for preparing a protein-polyphosphate isolate usable as a substitute for high-heat non-fat dried milk in bread making comprising:

(1) reacting a liquid cheese whey at a pH between 5 and 7 with hydrogen peroxide with an amount of peroxide sufficient to provide at least 0.25 grams of the $-O-O-$ peroxide moiety per gram of protein in the whey;

(2) adding to the product of step 1 from about 10 to about 40% by weight based on the total dry weight of the final protein-polyphosphate product of a linear condensed polyphosphate having a number average chain length of from about 6 to about 100;

(3) adjusting the pH above about 3 but less than 4 with the proviso that the pH be sufficiently acidic to effect precipitation of a protein-polyphosphate product;

(4) separating the product from the reaction medium;

(5) adding base to the so separated product to elevate the pH to a range of between about 5 and 7 to solubilize the product; and (6) drying the so solubilized product.

14. The process of claim 13 wherein said polyphosphate is sodium hexametaphosphate.

15. The process of claim 13 wherein said hydrogen peroxide is present in an amount of from about 0.3 to about 0.4 grams of the $-O-O-$ peroxide moiety per gram of whey protein.

References Cited

UNITED STATES PATENTS 3,269,843  8/1966  McKee et al. _____ 99—91 X

A. LOUIS MONACELL, Primary Examiner

J. R. HOFFMAN, Assistant Examiner

U.S. Cl. X.R.

260—121; 426—212

PO-1050
(5/69)

UNITED STATES PATENT OFFICE
CERTIFICATE OF CORRECTION

Patent No. 3,814,745            Dated June 4, 1974

Inventor(s) Nicholas Melachouris

It is certified that error appears in the above-identified patent and that said Letters Patent are hereby corrected as shown below:

Column 1, line 16, the word "Specification" was omitted.
Column 3, line 23, the word "through" should be -- though --.
Column 4, line 51, the word "arounnd" should be -- around --.
Columns 5 and 6, Table I, heading, column headings have
    "Eq" instead of -- Ex --.
Columns 5 and 6, Table I, Column for Example 4, sixth item
    is "9" and should be -- 7 --.
Column 7, line 4, subsection (3) of claim 1, "sufficient"
    should be -- sufficiently --.
Column 8, line 11, claim 13, subsection (3) after "pH"
    insert -- to a pH --.

Signed and sealed this 18th day of February 1975.

(SEAL)
Attest:

RUTH C. MASON
Attesting Officer

C. MARSHALL DANN
Commissioner of Patents
and Trademarks